United States Patent
Hauner et al.

(10) Patent No.: US 10,125,882 B2
(45) Date of Patent: Nov. 13, 2018

(54) VENTING AND/OR BLEEDING VALVE

(71) Applicant: VAG—Armaturen GmbH, Mannheim (DE)

(72) Inventors: Ivo Hauner, Ratiskovice (CZ); Heribert Herold, Manneheim (DE); Simon Schönhoff, Malsch (DE)

(73) Assignee: VAG—ARMATUREN GMBH, Mannheim (DE)

(*) Notice: Subject to any disclaimer, the term of this patent is extended or adjusted under 35 U.S.C. 154(b) by 0 days.

(21) Appl. No.: 15/598,392

(22) Filed: May 18, 2017

(65) Prior Publication Data

US 2017/0343126 A1    Nov. 30, 2017

(30) Foreign Application Priority Data

May 24, 2016  (DE) .................. 10 2016 109 495

(51) Int. Cl.
*F16K 24/04* (2006.01)
*E03F 5/08* (2006.01)
(Continued)

(52) U.S. Cl.
CPC ............ *F16K 24/042* (2013.01); *E03F 5/08* (2013.01); *F16K 24/044* (2013.01); *F16K 31/20* (2013.01);
(Continued)

(58) Field of Classification Search
CPC ......... Y10T 137/7365; Y10T 137/3012; Y10T 137/8326; Y10T 137/8242;
(Continued)

(56) References Cited

U.S. PATENT DOCUMENTS 5,570,015 A * 10/1996 Takaishi ............... G01B 7/02
                                                                137/554
6,082,392 A *  7/2000 Watkins, Jr. .......... B67D 7/002
                                                                137/312
(Continued)

FOREIGN PATENT DOCUMENTS

DE             3221377 C1    12/1983
DE    10 2008 010 573 A1     9/2009
(Continued)

OTHER PUBLICATIONS

Search Report for DE 10 2016 109 495.1 filed May 24, 2016.

*Primary Examiner* — Atif Chaudry
(74) *Attorney, Agent, or Firm* — Paul D. Bianco; Stephen Bongini; Fleit Gibbons Gutman Bongini & Bianco, PL

(57) ABSTRACT

A venting and/or bleeding valve with a valve housing, a main valve arranged in the valve housing for rapid venting and bleeding of piping connected to the valve housing, an auxiliary valve arranged in the valve housing for operating ventilation of the piping at operating pressure, and a float arranged within the valve housing and controlling the main valve and the auxiliary valve as a function of the filling level of a fluid located in the valve housing. The venting and/or bleeding valve contains a valve position sensor for acquisition of the position of the main valve, at least one additional sensor for acquisition of the humidity and/or the pressure and/or of the temperature in an interior space of the valve housing, and an evaluation unit for acquisition of an operating state of the venting and/or bleeding valve as a function of the values acquired by the valve position sensor and any additional sensor.

20 Claims, 3 Drawing Sheets

(51) Int. Cl.
*F16K 31/22* (2006.01)
*F16K 37/00* (2006.01)
*F16K 31/20* (2006.01)
*G01F 23/76* (2006.01)

(52) U.S. Cl.
CPC .......... *F16K 31/22* (2013.01); *F16K 37/0033* (2013.01); *F16K 37/0041* (2013.01); *F16K 37/0083* (2013.01); *F16K 37/0091* (2013.01); *G01F 23/76* (2013.01); *Y10T 137/3012* (2015.04); *Y10T 137/7365* (2015.04); *Y10T 137/8175* (2015.04); *Y10T 137/8225* (2015.04); *Y10T 137/8242* (2015.04); *Y10T 137/8326* (2015.04); *Y10T 137/8342* (2015.04)

(58) Field of Classification Search
CPC ......... Y10T 137/8342; Y10T 137/8175; Y10T 137/8225; F16K 24/042; F16K 24/044; F16K 31/20; F16K 31/22; F16K 37/0041; F16K 37/0033; F16K 37/0083; F16K 37/0091; G01F 23/76; E03F 5/08
See application file for complete search history.

(56) References Cited

U.S. PATENT DOCUMENTS

| | | | |
|---|---|---|---|
| 2003/0034305 A1* | 2/2003 | Luehmann | B01D 61/02 210/646 |
| 2003/0046997 A1* | 3/2003 | Waller | F25B 31/002 73/295 |
| 2013/0177416 A1* | 7/2013 | Renschler | F03D 11/0025 416/1 |
| 2016/0243509 A1* | 8/2016 | Kang | B01F 3/04808 |

FOREIGN PATENT DOCUMENTS

| | | | |
|---|---|---|---|
| DE | 20 2014 102 568 U1 | 9/2015 | |
| EP | 0096107 A1 * | 12/1983 | ............. F16K 17/19 |

* cited by examiner

VENTING AND/OR BLEEDING VALVE

FIELD OF THE DISCLOSURE

The disclosure relates to a venting and/or bleeding valve.

BACKGROUND

From DE 32 21 377 C1, a venting and bleeding valve is known, which contains a main valve that is arranged within a valve housing for rapid venting and bleeding of piping, as well as an auxiliary valve arranged in the valve housing for the operating ventilation. Both the main valve and the auxiliary valves are actuated by means of a float as a function of the filling level of a fluid located in the valve housing.

Such venting and bleeding valves are placed in piping systems, generally at high points of the line, and used for starting, for bleeding during operation, and also for safety in case of pipe rupture. During the filling of a piping system, it is possible, for example, using such valves, to remove the air located in the installation from the piping system. The air, which during operation arrives in the pipe due to the entry of air or due to the outgassing of air dissolved in water, and which as a result can be detrimental to the entire piping system, can also be removed during operation by means of such valves. In addition, by means of such valves, the pipes can also be ventilated if, for example, due to a pipe rupture, the rapid outflow of water and, as a result, the formation of low pressure within the pipe occur. However, such venting and bleeding valves in general have a closed structure, so that their operating state cannot be simply determined.

SUMMARY OF THE DISCLOSURE

The disclosure relates to an easy acquisition of the operating state in the case of a venting and/or bleeding valve of the aforementioned type.

Advantageous refinements and expedient embodiments of the venting and/or bleeding valve are also disclosed.

The venting and/or bleeding valve according to the disclosure comprises a valve position sensor for the acquisition of the position of the main valve, ensuring a rapid venting and/or bleeding, or a valve position sensor for the acquisition of the position of the auxiliary valve. As a result, it is possible, for example, to detect whether the main valve or the auxiliary valve is in an open or closed position. In addition, the venting and/or bleeding valve according to the disclosure contains at least one additional sensor, by means of which the pressure and/or humidity in an interior space of the valve housing and/or the temperature can be determined. The valve position sensor and the at-least-one additional sensor are moreover connected to an evaluation unit, by means of which an operating state of the venting and/or bleeding valve can be acquired on the basis of the values determined by the valve position sensor and the at-least-one additional sensor. From the acquired valve position and at least one additional operating parameter determined by the additional sensor, it is thus possible to draw conclusions regarding the operating state and/or malfunctions of the venting and/or bleeding valve.

Thus, for example, based on the signals of the valve position sensor and the signals of a pressure sensor and a filling level or humidity sensor, it is possible to detect whether the venting and/or bleeding valve is working properly or whether there is a malfunction. Moreover, by means of an additional temperature sensor, it is possible to determine whether the venting and/or bleeding valve is frozen.

In the evaluation unit, the signals supplied by the sensors can be processed by means of corresponding signal processing logic and associated with certain operating states of the venting and/or bleeding valve. The evaluation unit can contain a display device for displaying the operating states. The evaluation unit can also comprise a memory for recording acquired data of the venting and/or bleeding valve and an interface for wired or wireless communication with an external evaluation unit. Additional information regarding the actuation of the venting and/or bleeding valve can also be acquired and stored in the evaluation unit and read out as needed or transmitted by means of an appropriate interface to a computer or to another external evaluation device. The data transmission could occur by means of a cable or wirelessly, for example, via a USB or Bluetooth interface.

In a particularly advantageous embodiment, the valve position sensor is designed for the acquisition of the position of a valve body with respect to a valve seat of the main valve. The valve position sensor can be associated with a guide rod connected to the valve body for the acquisition of its position. In an advantageous embodiment, the valve position sensor can be arranged in a guide sleeve for axial guidance of the guide rod connected to the valve body.

The additional sensor can be advantageously designed as a combination sensor for the acquisition of the pressure and humidity, and optionally the temperature. However, separate sensors for the respective operating parameters can also be provided. The sensor is preferably arranged in the upper portion of a housing bottom section of the valve housing in the area of a valve body of the main valve. For example, the sensor can be screwed into a transverse bore of the housing bottom section.

The valve position sensor and the at-least-one additional sensor can be connected by means of wired or wireless data transmission to the evaluation unit.

In the case of the venting and bleeding valve, the main valve and auxiliary valve can be controlled by a shared float. However, the main valve and the auxiliary valve can also be controlled by separate floats.

BRIEF DESCRIPTION OF THE DRAWINGS

Additional special features and advantages of the disclosure result from the following description of a preferred embodiment example with reference to the drawings.

DETAILED DESCRIPTION

Figure 1:
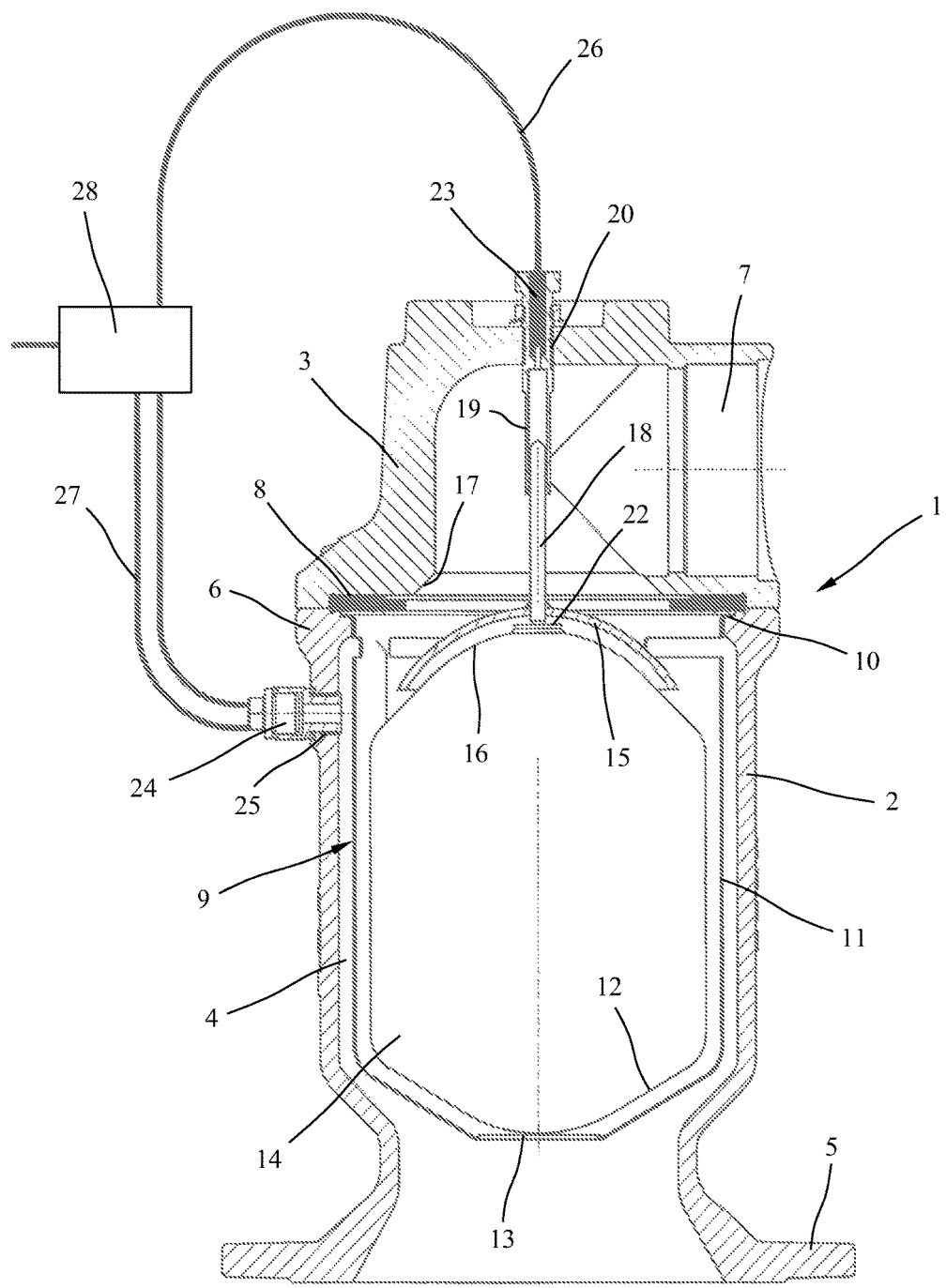
FIG. 1 shows a cross-sectional view of a venting and bleeding valve according to the disclosure in an open position.

The venting and bleeding valve shown in longitudinal cross section in FIG. 1 contains a valve housing 1, which, in the embodiment shown, is formed from a housing bottom section 2 and a housing cover 3 screwed to said housing bottom section. The hollow cylindrical housing bottom section 2, which is constructed as a hollow body and with an interior space 4 constructed as a continuous hollow space, comprises a lower connection flange 5 for fastening to a connecting piece of a pipe, and an upper connection flange 6 for fastening of the housing cover 3. The housing cover 3 contains a valve outlet 7 which is open toward the side and which can be attached by several screws distributed over the periphery on the upper connection flange 6 of the housing bottom section 2. For the sealing of the housing cover 3 with respect to the housing bottom section 2, an annular seal 8 is inserted between the housing cover 3 and the upper connection flange 6 of the housing bottom section 2.

In the interior space 4 of the housing bottom section 2 are arranged a guide or flow body 9 consisting of a thin-walled metal sheet and having a folded-over upper edge 10, a cylindrical part 11 spaced apart from the inner wall of the housing bottom section 2, and a funnel-shaped bottom 12 with an inflow opening 13. The guide or flow body 9 is held in the housing bottom section 2 by means of the edge 10 clamped between the upper connection flange 6 of the housing bottom section 2 and the housing cover 3. In the cylindrical part 11 of the guide or flow body 9, a float 14 is guided in an axially movable manner.

By means of the float 14, a bell-shaped first valve body 15 is actuated, which is movably arranged above a rounded upper part 16 of the float 14 within the valve housing 1, between a lower open position and an upper closed position; in the upper closed position, it is in contact with a valve seat 17 on the bottom side of the housing cover 3. The bell-shaped first valve body 15 is led in an axially movable manner by means of an upwardly protruding guide pin 18 within a guide sleeve 19 arranged in the housing cover 3. The guide sleeve 19 is screwed into a threaded bore 20 on the upper side of the housing cover 3. By means of the valve body 15 and the associated valve seats 17, a main valve for rapid venting and bleeding is formed. For improved sealing of the main valve, the seal 8 arranged between the housing bottom section 2 and the housing cover 3 is designed so that when the valve body 15 is in contact with the valve seat 17, it also is in contact with the inner side of the annular seal 8.

Figure 3:
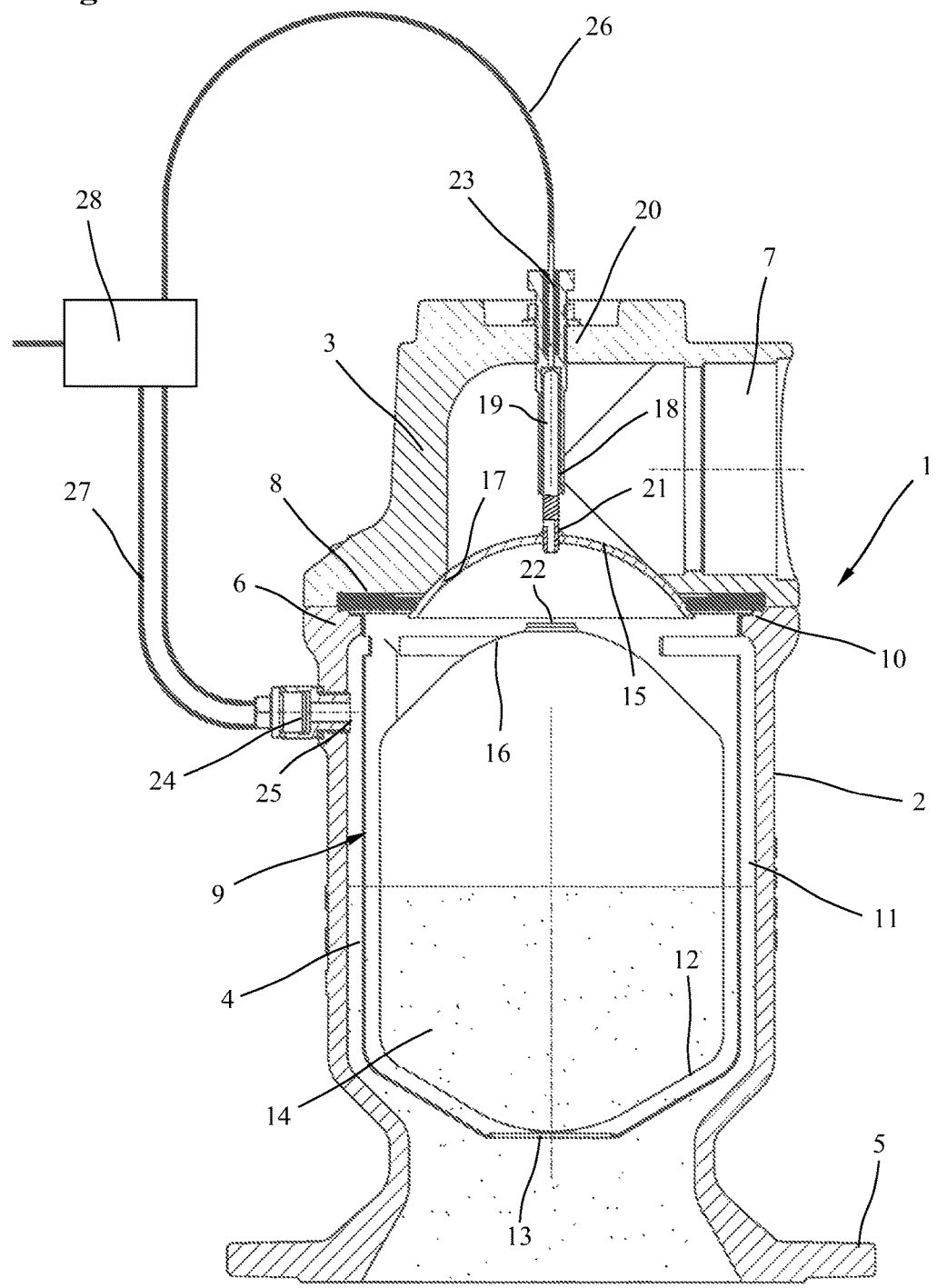
FIG. 3 shows a cross-sectional view of the venting and bleeding valve shown in FIG. 1 during operating ventilation.

As is apparent from FIG. 3, the guide pin 18 comprises an end that protrudes downwardly with respect to the bell-shaped valve body 17. In the guide pin 18, a venting bore 21, which is angled here, is arranged, which, with one its end opens on the bottom side of the bell-shaped valve body 15, and with its other end opens above the valve body 15 into the valve outlet 7. On the upper side of the float 14, a second valve body 22 formed as a sealing disk is arranged, which, together with the venting bore 21 in the guide pin 18 forms an auxiliary valve for the operating ventilation.

A valve position sensor 23 for the acquisition of the valve position is arranged on the valve housing 1. The valve position sensor 23 is formed so that it acquires the position of the main valve formed by the bell-shaped first valve body 15 and the valve seat 17. By means of the valve position sensor 23 shown in the drawing, the position of the bell-shaped first valve body 15 with respect to the valve seat 17 is acquired. In the embodiment shown, the valve position sensor 23 is associated with the guide rod 18 connected to the bell-shaped first valve body 15 of the main valve and arranged in the guide sleeve 19 screwed into the housing cover 3. The valve position sensor 23 can be a contact switch or contactless switch which interacts with the guide rod 18.

An additional sensor 24 for the acquisition of the temperature as well as the pressure and the humidity within the interior space 4 of the housing bottom section 2 is arranged on the valve housing 1. The sensor 24 is arranged in the upper part of the housing bottom section 2 in the area of the valve body 15 of the main valve. In the embodiment shown, the sensor 24 is formed as a combination sensor and screwed into a transverse bore 25 in the upper area of the lower housing section 2. The valve position sensor 23 and the additional sensor 24 are respectively connected by means of lines 26 and 27 to an evaluation unit 28. By means of the evaluation unit 28, the operating state of the venting and bleeding valve can be acquired on the basis of the values determined by the two sensors 23 and 24 and optionally displayed.

If, for example, the valve position sensor 23 supplies a signal for the open position of the main valve while the sensor 24 detects neither pressure nor humidity, this is an indication that the venting and bleeding valve is in an open position of rest. If, on the other hand, the valve position sensor 23 supplies a signal for a closed position of the main valve and the sensor 24 signals a working pressure and also humidity, this is an indication that the venting and bleeding valve is closed.

The operating mode of the above-described venting and bleeding valve is explained below with reference to FIGS. 1 to 3.

When piping, not shown, to which the venting and bleeding valve shown in FIG. 1 is connected, is emptied, the fluid level in the valve housing 1 of the venting and bleeding device drops, whereby the float 14 and the bell-shaped valve body 15 also move due to their own weight into a lower position of rest shown in FIG. 1. In the rest position, the main valve 15, 17 is completely open, so that air can flow in by means of the open main valve 15, 17 into the lower housing section 2 of the valve housing 1 and vent the piping. In this position, by means of the valve position sensor 23, a signal for the open position of the main valve is output while the sensor 24 detects neither pressure nor humidity. This is an indication that the venting and bleeding valve is in an open position.

If the piping is filled again with fluid, the air located in the piping can flow by means of the open main valve 15, 17 first into the valve outlet 7 and from there to the atmosphere. The float 14 and the first valve body 15 formed as a valve bell are not entrained in the process by the outflowing air due to the constructive design. By means of the open main valve 15, 17, an optimized flow guidance for the removal of larger quantities of air is achieved.

Figure 2:
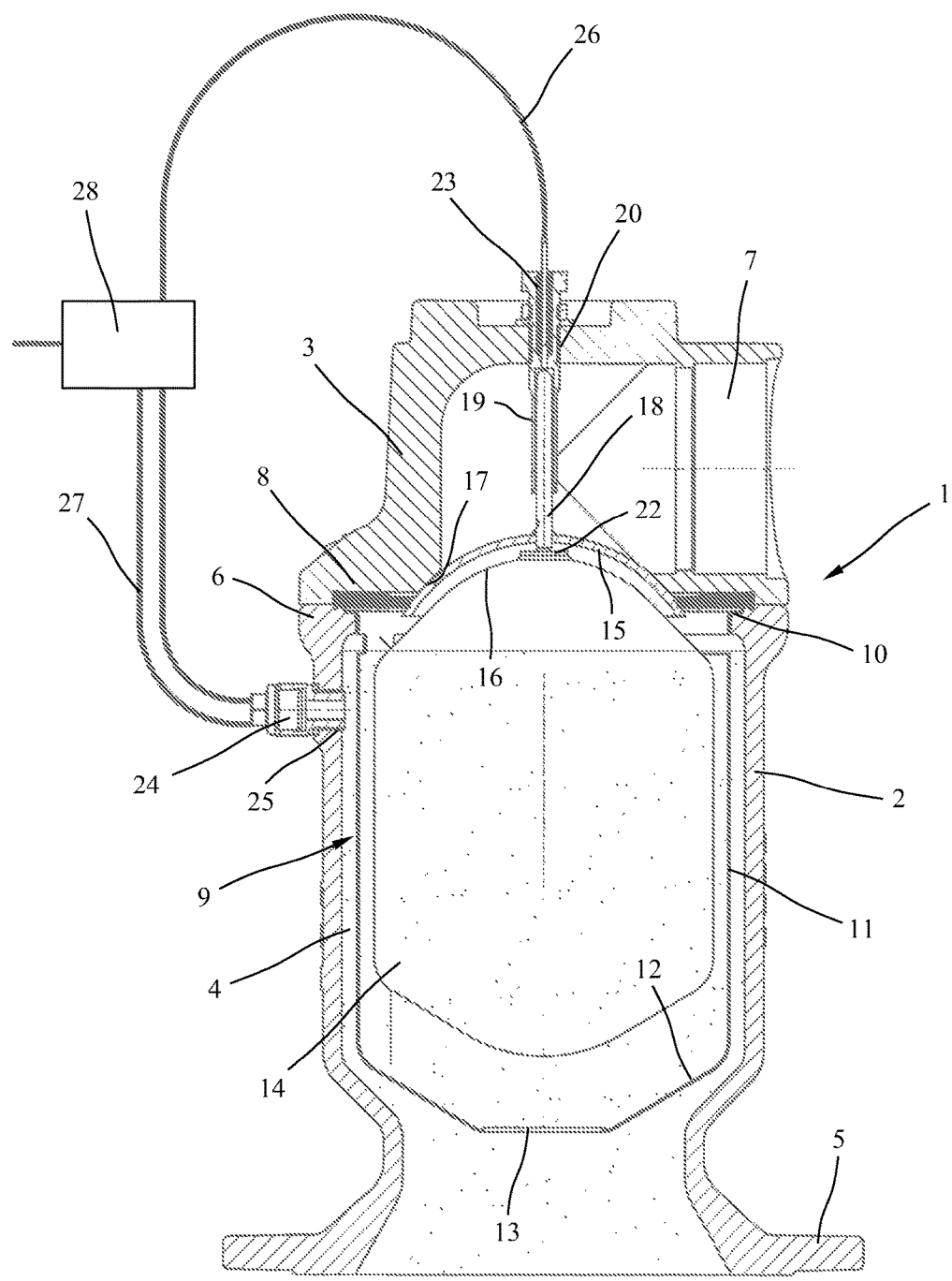
FIG. 2 shows a cross-sectional view of the venting and bleeding valve shown in FIG. 1 in a closed position.

When the piping is completely ventilated, the water level in the housing 1 rises, wherein the float 14 is buoyed by the inflowing fluid, reaches the closed final position represented in FIG. 2, and in the process also pushes the valve body 15 of the main valve into the closed position. In this position, by means of the valve position sensor 23, a signal for the closed position of the main valve 15, 17 is output, while the sensor 24 detects a working pressure and also the humidity.

Due to the air collecting during the operation in the housing 1, the fluid level is lowered. As a result, the float 14 also drops and, by means of the second valve body 22, clears the venting bore 21. The air can flow out at high speed for the venting of the piping under full operating pressure. At the same time, replenishing fluid again flows in, so that the float 14 is again buoyed and the venting bore 21 is again closed by means of the valve body 22. During this process, due to the internal pressure, the valve body 15 of the main valve remains in the closed final position. In this operating ventilation, by means of the valve position sensor 23, a signal for the closed position of the main valve 15, 17 is output, while the sensor 24 detects an operating pressure but no humidity. This is an indication that the venting and bleeding valve is in an operating ventilation mode. The measurement of the duration of the humidity signal and the sensor 24 in connection with the valve position sensor 23 can give information regarding whether sufficient air at working pressure is removed from the venting and bleeding valve.

Any possible operating malfunction can also be determined on the basis of certain signal combinations of the sensors 23 and 24. For example, when the valve position sensor 23 outputs a signal for the open position of the main valve 15, 17, and the sensor 24 does not acquire pressure but does acquire humidity, this is an indication that the venting and bleeding valve does not close. On the other hand, if the valve position sensor 23 outputs a signal for the closed position of the main valve 15, 17, and the sensor 24 acquires no pressure and no humidity, this is an indication that the venting and bleeding valve does not open. An example for a signal processing logic of the processing unit 28 for the determination of different operating states on the basis of the above-described sensor system is shown in the following table.

| Operating state | Valve position | Pressure | Humidity | Temperature |
|---|---|---|---|---|
| Valve in a rest position | Open | No pressure | No signal | >0° C. |
| Valve closed | Closed | Displays working pressure | Signal | >0° C. |
| Valve does not close | Open | No pressure | Signal | >0° C. |
| Valve does not open | Closed | No pressure | No signal | >0° C. |
| Operating ventilation does not work | Closed | Displays no pressure | No signal with time measurement | >0° C. |
| Critical high point | Open | Displays working pressure | Signal | >0° C. |
| Operating ventilation works | Closed | Displays working pressure | No signal | >0° C. |
| Valve frozen | Open/Closed | No pressure/ working pressure | Signal | <0° C. |

This table shows that by using the above-described sensor system, a comprehensive picture of the operating state of a venting and bleeding valve can be obtained.

The disclosure is not limited to the above-described venting and bleeding valve. The sensor system can also be used with venting and bleeding valves of a different construction or with valves that are used exclusively as venting valves or bleed valves.

LIST OF REFERENCE NUMERALS

1 Valve housing
2 Housing bottom section
3 Housing cover
4 Interior space
5 Lower connection flange
6 Upper connection flange
7 Valve outlet
8 Seal
9 Guide or flow body
10 Edge
11 Cylindrical part
12 Bottom
13 Inflow opening
14 Float
15 First valve body
16 Upper part of the float
17 Valve seat
18 Guide pin
19 Guide sleeve
20 Threaded bore
21 Venting bore
22 Second valve body
23 Valve position sensor
24 Sensor
25 Transverse bore
26 Line
27 Line
28 Evaluation unit

What is claimed is:

1. A venting and/or bleeding valve comprising:
   a valve housing;
   a main valve arranged in the valve housing for rapid venting and bleeding of a piping connected to the valve housing;
   an auxiliary valve arranged in the valve housing for operating ventilation of the piping at operating pressure;
   a float arranged within the valve housing, the float controlling the main valve or both the main valve and the auxiliary valve as a function of a filling level of a fluid located in the valve housing;
   a valve position sensor for acquisition of the position of the main valve or of the auxiliary valve;
   at least one additional sensor for acquisition of the humidity and pressure in an interior space of the valve housing; and
   an evaluation unit for acquisition of an operating state of the venting and/or bleeding valve as a function of the values acquired by the valve position sensor and the at least one additional sensor, the evaluation unit being configured to determine at least one operating malfunction of the venting and/or bleeding valve on the basis of a combination of the values acquired by the valve position sensor and the at least one additional sensor.

2. The venting and/or bleeding valve according to claim 1, wherein the valve position sensor is formed for acquisition of the position of a valve body opposite a valve seat of the main valve.

3. The venting and/or bleeding valve according to claim 2, wherein the valve position sensor is associated with a guide rod connected to the valve body for acquisition of its position.

4. The venting and/or bleeding valve according to claim 3, wherein the valve position sensor is arranged in a guide sleeve for axial guidance of the guide rod connected to the valve body.

5. The venting and/or bleeding valve according to claim 2, wherein the at least one additional sensor is arranged in an upper portion of a housing bottom section of the valve housing in an area of the valve body of the main valve.

6. The venting and/or bleeding valve according to claim 5, wherein the at least one additional sensor is screwed into a transverse bore of the housing bottom section.

7. The venting and/or bleeding valve according to claim 2, wherein the valve body of the main valve is formed as a valve bell for contact with the valve seat arranged on the bottom side of a housing lid.

8. The venting and/or bleeding valve according to claim 3, wherein the auxiliary valve is formed by a venting bore in the guide rod and by a valve body on an upper side of the float.

9. The venting and/or bleeding valve according to claim 1,
wherein the valve position sensor and the at least one additional sensor are connected by a cable or by wireless data transmission to the evaluation unit, and
the at least one operating malfunction comprises at least one of the venting and/or bleeding valve will not close, the venting and/or bleeding valve will not open, and the venting and/or bleeding valve is not sufficiently ventilating the piping at operating pressure.

10. The venting and/or bleeding valve according to claim 1, further comprising a temperature sensor for acquisition of temperature in the interior space of the valve housing.

11. The venting and/or bleeding valve according to claim 1, wherein the evaluation unit is configured to determine any possible operating malfunction of the venting and/or bleeding valve on the basis of the combination of the values acquired by the valve position sensor and the at least one additional sensor.

12. A venting and/or bleeding valve comprising:
a valve housing;
a main valve arranged in the valve housing for venting and bleeding of a piping connected to the valve housing, the main valve having a valve body and a valve seat;
a float arranged within the valve housing;
a guide rod connected to the valve body, the guide rod having a venting bore with a first end opening on a first side of the valve body and a second end opening on a second side of the valve body;
a guide sleeve connected to the valve housing, the guide rod axially movable within the guide sleeve;
an auxiliary valve arranged in the valve housing for operating ventilation of the piping at operating pressure, the auxiliary valve formed by a sealing disk and the venting bore;
a valve position sensor for acquisition of the position of at least one of the main valve and the auxiliary valve, the valve position sensor operatively associated with the guide sleeve and guide rod;
a pressure and temperature sensor for acquisition of both humidity and pressure in an interior space of the valve housing; and
an evaluation unit configured to determine an operating state and operating malfunctions of the venting and/or bleeding valve as a function of the values acquired by the valve position sensor and the pressure and temperature sensor,
wherein the float controls both the main valve and the auxiliary valve as a function of a filling level of a fluid located in the valve housing, and
the evaluation unit is configured to determine whether the venting and/or bleeding valve is working properly or there is an operating malfunction on the basis of a combination of the values acquired by the valve position sensor and the pressure and temperature sensor.

13. A venting and/or bleeding valve comprising:
a valve housing;
a main valve arranged in the valve housing for rapid venting and bleeding of a piping connected to the valve housing;
an auxiliary valve arranged in the valve housing for operating ventilation of the piping at operating pressure;
a float arranged within the valve housing, the float controlling the main valve or both the main valve and the auxiliary valve as a function of a filling level of a fluid located in the valve housing;
a valve position sensor for acquisition of the position of the main valve or of the auxiliary valve;
at least one additional sensor for acquisition of at least the humidity and pressure in an interior space of the valve housing; and
an evaluation unit configured to determine an operating state of the venting and/or bleeding valve on the basis of a combination of the values acquired by the valve position sensor and the at least one additional sensor,
wherein the evaluation unit is configured to determine that the venting and/or bleeding valve is open and working properly when the valve position sensor detects the open position of the main valve while the at least one additional sensor detects neither pressure nor humidity,
the evaluation unit is configured to determine that the venting and/or bleeding valve is closed and working properly when the valve position sensor detects the closed position of the main valve while the at least one additional sensor detects an operating pressure and detects humidity, and
the evaluation unit is configured to determine that the venting and/or bleeding valve is ventilating the piping at operating pressure and working properly when the valve position sensor detects the closed position of the main valve while the at least one additional sensor detects an operating pressure and does not detect humidity.

14. The venting and/or bleeding valve according to claim 13, wherein the evaluation unit is configured to determine that there is an operating malfunction because the venting and/or bleeding valve will not close when the valve position sensor detects the open position of the main valve and the at least one additional sensor does not detect pressure and does detect humidity.

15. The venting and/or bleeding valve according to claim 13, wherein the evaluation unit is configured to determine that there is an operating malfunction because the venting and/or bleeding valve will not open when the valve position sensor detects the closed position of the main valve and the at least one additional sensor detects neither pressure nor humidity.

16. The venting and/or bleeding valve according to claim 13, wherein the evaluation unit is configured to determine that there is an operating malfunction because the venting and/or bleeding valve is not sufficiently ventilating the piping at operating pressure on the basis of the valve position sensor detecting the closed position of the main valve and a measurement of duration of a humidity signal from the at least one additional sensor.

17. The venting and/or bleeding valve according to claim 13, wherein the evaluation unit is configured to determine that the venting and/or bleeding valve has reached a critical high point when the valve position sensor detects the open position of the main valve and the at least one additional sensor detects an operating pressure and detects humidity.

18. The venting and/or bleeding valve according to claim 13, wherein the evaluation unit is configured to determine that there is an operating malfunction because the venting and/or bleeding valve is frozen when the at least one additional sensor detects humidity and detects that the temperature is below zero.

19. The venting and/or bleeding valve according to claim 13,
wherein the evaluation unit is configured to determine that there is an operating malfunction because the venting and/or bleeding valve will not close when the valve position sensor detects the open position of the main valve and the at least one additional sensor does not detect pressure and does detect humidity,
the evaluation unit is configured to determine that there is an operating malfunction because the venting and/or bleeding valve will not open when the valve position sensor detects the closed position of the main valve and the at least one additional sensor detects neither pressure nor humidity, and
the evaluation unit is configured to determine that there is an operating malfunction because the venting and/or bleeding valve is not sufficiently ventilating the piping at operating pressure on the basis of the valve position sensor detecting the closed position of the main valve and a measurement of duration of a humidity signal from the at least one additional sensor.

20. The venting and/or bleeding valve according to claim 19,
wherein the evaluation unit is configured to determine that the venting and/or bleeding valve has reached a critical high point when the valve position sensor detects the open position of the main valve and the at least one additional sensor detects an operating pressure and detects humidity, and
the evaluation unit is configured to determine that there is an operating malfunction because the venting and/or bleeding valve is frozen when the at least one additional sensor detects humidity and detects that the temperature is below zero.

\* \* \* \* \*

UNITED STATES PATENT AND TRADEMARK OFFICE
CERTIFICATE OF CORRECTION

PATENT NO. : 10,125,882 B2
APPLICATION NO. : 15/598392
DATED : November 13, 2018
INVENTOR(S) : Ivo Hauner et al.

It is certified that error appears in the above-identified patent and that said Letters Patent is hereby corrected as shown below:

On the Title Page

Below item (72) correct the address of the second inventor Heribert Herold as follows:
Mannheim (DE)

Signed and Sealed this
Twenty-fifth Day of December, 2018

Andrei Iancu
*Director of the United States Patent and Trademark Office*